United States Patent [19]
von Kienlin et al.

[11] Patent Number: 5,548,407
[45] Date of Patent: Aug. 20, 1996

[54] PROCESS FOR ELECTRONIC PROCESSING OF MULTI-COLORED CONTINUOUS-TONE IMAGES

[75] Inventors: Albrecht J. von Kienlin, Schwalbach; Peter Urban, Gorxheimertal, both of Germany

[73] Assignee: Albrecht von Kienlin, Schwalbach, Germany

[21] Appl. No.: 63,659

[22] Filed: May 20, 1993

[30] Foreign Application Priority Data

May 22, 1992 [DE] Germany ............................ 42 16 932.1
Apr. 24, 1993 [EP] European Pat. Off. .............. 93106690

[51] Int. Cl.$^6$ ............................... H04N 1/40; H04N 1/46; H04N 1/52
[52] U.S. Cl. ........................ 358/298; 358/533; 358/535; 358/536
[58] Field of Search ...................... 358/296, 298, 358/300, 448, 454, 456–458, 515, 518, 523, 530, 533–536, 538; 347/115, 131, 188, 232; 382/162, 164, 167; 395/107–109, 115, 116, 131, 137

[56] References Cited

U.S. PATENT DOCUMENTS

| | | |
|---|---|---|
| 1,742,543 | 1/1930 | Ives . |
| 4,468,706 | 8/1984 | Cahill ...................................... 358/300 |
| 4,884,080 | 11/1989 | Hirahara et al. ...................... 358/298 X |
| 4,916,545 | 4/1990 | Granger .................................. 358/456 |
| 4,924,301 | 5/1990 | Surbrook ................................. 358/534 |
| 4,974,067 | 12/1990 | Suzuki et al. ........................ 358/458 X |
| 5,107,331 | 4/1992 | Collell et al. ....................... 358/456 X |
| 5,166,809 | 11/1992 | Surbrook ................................. 358/456 |
| 5,287,209 | 2/1994 | Hiratsuka et al. ....................... 395/109 |
| 5,309,246 | 5/1994 | Barry et al. ........................... 358/298 |
| 5,394,252 | 2/1995 | Holladay et al. ....................... 358/533 |

FOREIGN PATENT DOCUMENTS

| | | | |
|---|---|---|---|
| 0126782 | 12/1984 | European Pat. Off. | ......... H04N 1/40 |
| 0170136 | 2/1986 | European Pat. Off. | ............. B41J 3/04 |
| 0254448 | 1/1988 | European Pat. Off. | ......... H04N 1/46 |
| 0370271 | 5/1990 | European Pat. Off. | ....... G06K 15/12 |
| 0417806 | 3/1991 | European Pat. Off. | ......... H04N 1/46 |
| 0444290 | 9/1991 | European Pat. Off. | ......... H04N 1/46 |
| 3409770 | 6/1990 | Germany | .......................... H04N 1/00 |
| 4025793 | 2/1992 | Germany | .......................... H04N 1/00 |
| 4133474 | 5/1992 | Germany | .......................... G09G 1/02 |
| 3-101568 | 4/1991 | Japan | .............................. H04N 1/40 |
| 3-187676 | 8/1991 | Japan | .............................. H04N 1/40 |
| 90/05423 | 5/1990 | WIPO | ............................. H04N 1/46 |
| 93/03574 | 2/1993 | WIPO | ............................. H04N 1/46 |

OTHER PUBLICATIONS

"Frequenzmodulierte Rasterverfahren und ihre Eignung für niedrig auflösende Widergabesysteme", V. Humbel, St. Gallen, Dec. 1990.

Stoffel et al. in IEEE Transaction of Communications, Vo. COM–29, No. Dec. 1981, pp. 1898 to 1925.

Tokunaga et al. in IEEE Transactions of Electron Devices, vol. ED–30, No. B, Aug. 1983, pp. 898 to 904.

*Primary Examiner*—Peter S. Wong
*Assistant Examiner*—Eric Frahm
*Attorney, Agent, or Firm*—Wenderoth, Lind & Ponack

[57] ABSTRACT

Halftoned frequency modulated color separations are produced from continuous-tone multicolored artefacts. The continuous tone values of the pixels of the scanned artefact are simulated by once and for all fixed halftone dot patterns within the pixels (tiles) of the halftoned reproduction. The dot patterns of the different tone levels are different for each individual color separation but are connected with each other through criteria specifying an overlapping dot ratio in conjunction with a translation prohibition, thereby substantially suppressing moiré, disturbing effects of mis-register (e.g. color shifts) and graininess that is often seen in the highlights and midtones of reproductions with stochastic distribution of the halftone dots.

6 Claims, 6 Drawing Sheets

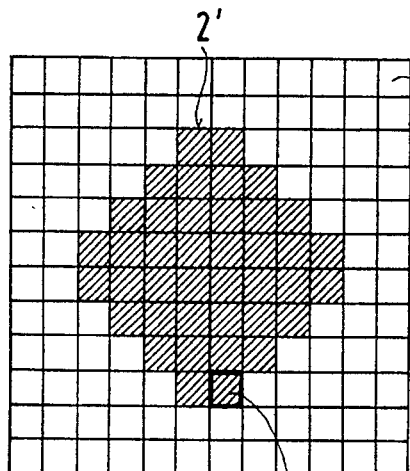
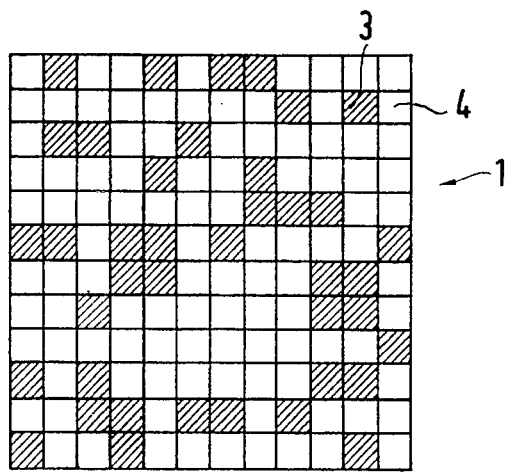
FIG.2  FIG.3
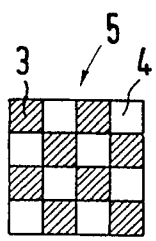 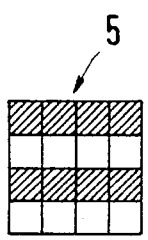 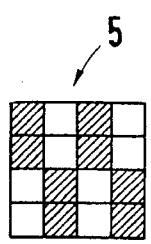 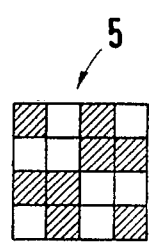 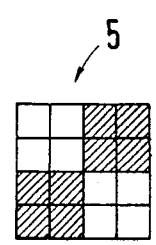
FIG.4  FIG.5  FIG.6  FIG.7  FIG.8
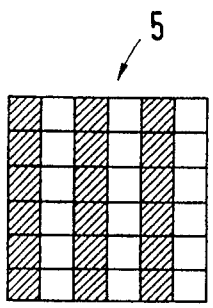 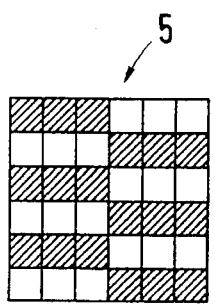 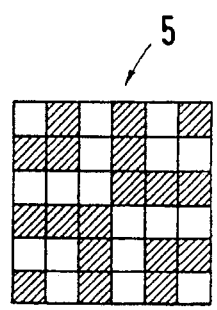
FIG.9  FIG.10  FIG.11

FIG.12 (≡ FIG.4) 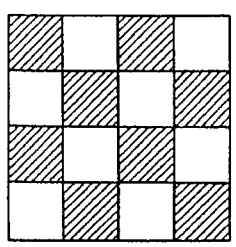
a a'
FIG.14 (≡ FIG.6) 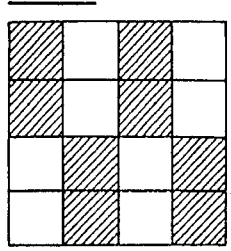
b b' c
FIG.17 (≡ FIG.5) 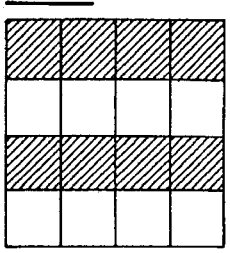
c' c'' c'''
FIG.20 (≡ FIG.7) 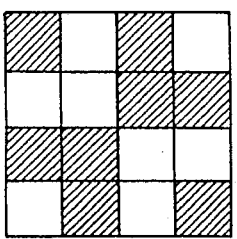
d d' e e'
FIG.24 (≡ FIG.8) 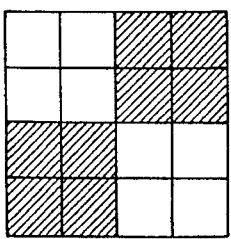
f g h i j j' k k'

FIG.32

| x |   | x |   |
|---|---|---|---|
| b | a | b | a |
| a | b | a | b |
|   | x |   | x | a+b

FIG.33

| x |   | x |   |
|---|---|---|---|
| c | a | c | a |
| x |   | x |   |
| c | a | c | a | a+c

FIG.34

| x | b' | a |   |
|---|----|---|---|
|   | a  | b'| x |
| x | b' | a |   |
|   | a  | b'| x | a+b'

FIG.35

| x |   | x |   |
|---|---|---|---|
| x |   | x |   |
| c | b | c | b |
| c | b | c | b | b+c

FIG.36

| x  | b' | b  |    |
|----|----|----|----|
| b  |    | x  | b' |
| b' | x  |    | b  |
|    | b  | b' | x  | b+b'

FIG.37

| x | b' | c  |    |
|---|----|----|----|
| c |    | x  | b' |
| x | b' | c  |    |
| c |    | x  | b' | c+b'

FIG.38

| z | b' | y |   |
|---|----|---|---|
| x | a  | y | x |
| y | x  | x | b |
| c | x  | x | y | a+b+c+b'

FIG.39

| x |   | x |   |
|---|---|---|---|
| c |   | x | d |
| x | d | c |   |
| c | d | c | d | c+d

FIG.40

| x |   | x |   |
|---|---|---|---|
|   | a | d | x |
| x | d | a |   |
|   | x |   | x | a+d

FIG.41

| a  | d' | a  | d' |
|----|----|----|----|
| d' | x  |    | a  |
| a  |    | x  | d' |
| d' | a  | d' | a  | a+d'

FIG.42

| x |   | x |   |
|---|---|---|---|
| b |   | x | d |
| d | x |   | b |
|   | x |   | x | b+d

FIG.43

| b  | d' | b  | d' |
|----|----|----|----|
| x  | d' | b  |    |
|    | b  | d' | x  |
| d' | b  | d' | b  | b+d'

FIG.44

| d  |    | d  |    |    | d' |    | d' |
|----|----|----|----|----|----|----|----|
|    |    |    | d  | d  | d' | d' |    |
| d  | d  |    |    |    |    | d' | d' |
|    | d  |    | d  | d' |    | d' |    |
|    |    | d' |    | d' | d  |    | d  |
| d' | d' |    |    |    |    | d  | d  |
|    |    | d' | d' | d  |    | d  |    |
| d' |    | d' |    |    | d  |    | d  | d+d'

FIG.45

| d  |    | d  |    |    | d' |    | d' |
|----|----|----|----|----|----|----|----|
|    |    |    | d  | d  | d' | d' |    |
| d  | d  |    |    |    |    | d' | d' |
|    | d  |    | d  | d' |    | d' |    |
| d  |    | d  |    |    | d' |    | d' |
|    |    |    | d  | d  | d' | d' |    |
| d  | d  |    |    |    |    | d' | d' |
|    | d  |    | d  | d' |    | d' |    | d+d'

| Scan Value | Tile Number | Error |
|---|---|---|
| 0 | 0 | 0 |
| 1 | 0 | -1 |
| 2 | 0 | -2 |
| 3 | 0 | -3 |
| 4 | 0 | -4 |
| 5 | 0 | -5 |
| 6 | 0 | -6 |
| 7 | 0 | -7 |
| 8 | 1 | 8 |
| 9 | 1 | 7 |
| 10 | 1 | 6 |
| 11 | 1 | 5 |
| 12 | 1 | 4 |
| 13 | 1 | 3 |
| 14 | 1 | 2 |
| 15 | 1 | 1 |
| 16 | 1 | 0 |
| 17 | 1 | -1 |
| 18 | 1 | -2 |
| 19 | 1 | -3 |
| 20 | 1 | -4 |
| 21 | 1 | -5 |
| 22 | 1 | -6 |
| 23 | 1 | -7 |
| 24 | 2 | 8 |
| 25 | 2 | 7 |
| 26 | 2 | 6 |
| 27 | 2 | 5 |
| 28 | 2 | 4 |
| 29 | 2 | 3 |
| 30 | 2 | 2 |
| 31 | 2 | 1 |
| 32 | 2 | 0 |
| 33 | 2 | -1 |
| 34 | 2 | -2 |
| 35 | 2 | -3 |
| 36 | 2 | -4 |
| 37 | 2 | -5 |
| 38 | 2 | -6 |
| 39 | 2 | -7 |
| and so on | | |

FIG. 48

PROCESS FOR ELECTRONIC PROCESSING OF MULTI-COLORED CONTINUOUS-TONE IMAGES

BACKGROUND OF THE INVENTION

1. Field of the Invention

The invention relates to a process for electronic processing of multicolored continuous-tone (contone) images, during which process the original, divided in the shape of an orthogonal screen of areal scan elements, is scanned line by line or column by column; the brightness of the individual scan elements is determined and converted into digital tone values, the brightness being based on the respective color separations; a screened reproduction of the original that is divided into square recording fields of expediently identical size is obtained by printing a number of dots, which correspond to the respective tone value, exhibit identical color density, and are set on the individual areal recording elements of the respective recording field; each recording field is divided into square tiles of expediently identical size with a specific number of recording elements; the number of tone levels that can be differentiated within a tile is specified by the number of recording elements contained in a tile; distributions (dot pattern) of the dots corresponding numerically to the tone levels are assigned to the individual tone levels within the tile, distributions being defined within the tile and determined prior to the completion of screening and held available in a data memory (as bit maps); and the specific dot patterns are obtained, starting from fixed basic dot patterns, by adding or subtracting dots.

The term "dots" is understood to denote any kind of graphic dot representation, where as the term "dot" is not limited to a geometric point but rather represents an area element of small size.

2. Description of the Related Art

With such a process multicolored continuous-tone images can be reproduced on a recording medium, e.g. a sheet of paper, a printing plate or a film by means of individual recording elements, which are of identical size and whose total area is either inked up or is not inked up. The image information of the continuous-tone image is first scanned by a sensor or scanning device, such as a scanner. To this end, the continuous-tone image is scanned, e.g., line by line, scan element by scan element, with a light beam. The scanner emits for each scan element an analog voltage signal, which corresponds to the brightness of the scan element illuminated by incident light. In the case of colored originals, the light beam is dispersed into three colors (red, green, blue) by way of a filter and the brightness of each is determined. For the purpose of increasing the local contrast (so-called detail contrast) the ambient field of the scan element is frequently also recorded. The analog voltage signals are subdivided by way of analog-digital converters into digital tone values of, e.g., 256 ($=2^8$) tone levels (0–255), so that they can be processed as 8 bit data blocks.

Continuous-tone images, where the tone values lie between a minimum and a maximum value, are recorded as screened halftone copies, where dots with maximum tone value are applied on the recording medium. The tone value determined for a specific spot of the continuous-tone image is simulated by putting a number of dots, which result in a percentage dot area corresponding to the tone value, on the corresponding spot of the screened reproduction. One or several dots can be combined into a screen dot, so that, e.g. in the individual recording fields, which comprise recording elements and into which the halftoned copy is subdivided, each screen dot comprises a more or less large number of dots. Thus, it is possible to reproduce the original picture with numerous discrete dots, i.e. halftoned.

In the conventional screening method to reproduce the tone value at one spot of the original, a number of dots that correspond to the percentage dot area are combined into a single screen dot, which is put in the center of the recording field. When overprinting several color separations, the resulting color perceived by the eye depends on the extent to which the screen dots of the individual color separations overlap. Small, mounting-induced displacements of the color separations (socalled register variations) can lead to changes in color. With the conventional screen this disturbing effect is counteracted through angular rotation of the screen of the individual color separations. In so doing, however, the problem of forming rosetta moirés and other moiré patterns arises and the number of possible color separations is limited. In this manner and with other disturbing effects such as tone skip when dot contact is occurring for the first time and obliteration of dots at low tone values—the quality of the halftoned copy is impaired. In addition, recording moirés can occur when in a color separation there is interference between the screen and regular (periodic) structures of the original.

To avoid such disturbing effects a number of screening methods with random dot distribution have been developed (cf. e.g. V. Humbel "Frequency modulated screening and its suitability for low resolution reproduction systems", Report 1989/1, EMPA, UGRA, St. Gallon, December 1990), in which process the dots to be set are not combined in the center of the recording field, but rather are distributed more or less arbitrarily (randomly) over the entire recording field. It has been demonstrated, however, that when dots are distributed randomly a certain granularity and excessive noise in the screened reproduction is produced, a feature that occurs in particular in the midtone range, when in many places—nonuniformly distributed—dot contact occurs for the first time between several dots. In addition, as a consequence of randomly setting the dots even in areas with identical tone value accumulations of dots and areas with below average dot number can occur and lead to darker or brighter spots (formation of clustered dots and clustered no prints).

SUMMARY OF THE INVENTION

The object of the invention is to design a process of the aforementioned kind, with which process an almost exact reproduction of the original is obtainable with a low number of computing instructions while avoiding disturbing effects due to register variations, interferences, obliteration of dots at low tone values and tone skip when dot contact is occuring for the first time as well as due to granularity, excessive noise in the dot distribution, and the formation of clustered dots and clustered no prints.

This problem is solved substantially with the invention by starting from basic dot patterns for 50% area coverage when determining the dot distribution within the tile and by using different basic dot patterns for the individual color separations.

The technological progress targeted by the process according to the invention is based on a novel combination of selection criteria with regard to the dot patterns and the process steps during screening.

A known criterion for the selection of suitable dot distributions consists of avoiding low frequency dot patterns in order to obtain a stable resulting color (cf. Tokunaga et al. in IEEE Transactions on Electron Devices, Vol. ED-30, No. B, August 1983, pp. 898 to 904) or the dots being uniformly distributed (cf. Stoffel et al. in IEEE Transaction on Communications, Vol. COM-29, No. 12, Dec. 1981, pp. 1898 to 1925 and DE-A-4 025 793). This criterion is taken into consideration especially with a chess board pattern, where the recording elements touch only over one corner up to 50% dot area (cf. e.g. Stoffel et al., loc. cit., FIG. 30; DE-C-3 409 770, FIG. 4/7 and U.S. Pat. No. 5,107,331, FIG. 8).

A significant improvement with respect to the quality of the halftoned copy results according to the invention from starting from a dot distribution for 50% area coverage ("basic dot pattern") that fulfills the criterion "as uniform as possible dot distribution" in order to record the individual tone values and from determining the pattern for the other tone levels by adding or subtracting dots from this dot area.

The establishment of specific dot patterns for the individual tone levels starts from basic dot patterns for 50% area coverage, because the register variations for pairs of combinations of color separations have an especially strong effect, when each one of the color separations covers 50% of an area. To keep the disturbing effects due to register variations low, it is proposed according to one configuration of the invention that the basic dot patterns of the tiles that are used for the individual color separations are different from color separation to color separation, because they cannot be conveyed into each other through translation by one or more recording elements, and because when superimposing pairs of basic dot patterns of the different color separations, the ratio of the overlapping dots ü to the non-overlapping dots n is equal to 1 or as close to 1 as possible; or because for an overlapping ratio of ü: n≠1, basic dot pattern combinations ü, n and ü', n' are used alternatingly, where n'/ü'=ü/n.

With the invention it is proposed in particular to use different basic dot patterns, which result from 90° rotation, from enlarging subtiles, shifting apart subtiles or reflecting subtiles.

Thus, criteria are established that ensure that the basic dot patterns for the individual color separations are as different as possible. In this manner disturbing effects, caused by register variations, are kept low. Due to the criterion that the basic dot patterns be as different as possible, the invention differs fundamentally from other screening methods, where different dot patterns are used for different color separations.

In the process described in the U.S. Pat. No. 4,884,080, the angular rotation between individual color separations is achieved by repeating the translation of a dot pattern twice for 3×3 tiles by one recording element and by repeatedly lining up the three tiles thus generated. The basic dot patterns within the 3×3 tiles do not differ in the individual color separations—apart from the translation. In another process (U.S. Pat. No. 5,107,331) all color separations are based on a chess board pattern, which is shifted during the individual color separations. However, the problem of register variations is not eliminated apparently with this method. Namely they result in the individual patterns being shifted into one other more or less.

In the process described in the EP-A-0 417 806, linear elements, which grow both in length and width with increasing tone value, thus for each color separation the direction of the linear elements is different, are constructed starting from one or more dots within a tile. This process can be implemented only with relatively large tiles (e.g. FIG. 7: 20×20), where the spatial resolution is unsatisfactory and the lines can be detected by the eye individually (cf. FIG. 7) or in special combinations as rosetta moirés (cf. FIG. 3E).

The criterion—that the basic dot pattern be as different as possible—should be taken into consideration with another embodiment of the invention especially when—to realize dot area levels of more or less than 50%—dots are added to or subtracted from the basic dot patterns.

Several variations of patterns that are determined on the basis of different basic dot patterns can be assigned to one tone level of a color separation. The fundamental basic dot patterns can be defined in a specified order or by random choice from a plurality of possible dot distributions. Through random selection the risk of interference and regular (periodic) structures that are not part of the image and can be perceived by the eye can also be minimized.

To implement the process of the invention, tiles with 4×4 recording elements are preferably used, since for tiles of this size an adequate diversity of basic dot patterns, which meet the aforementioned criteria, can already be realized, and since the spatial resolution for this size of tile is still good.

Depending on the size of the tiles, a limited number of dot area levels can be realized by varying the number of dots contained in the tiles. The maximum number of 256 tone levels, which can be differentiated on the scanning side with 8 bits, is thus greater than the number of dot area levels present in small tiles. If the tone level does not correspond by accident to a dot area level which can be represented in the tile, the image is not correctly rendered at this spot. For this reason in a preferred embodiment of the invention, the error resulting from the use of a tile that can almost exactly reproduce the respective tone value but usually not totally is taken into consideration when processing other tiles.

BRIEF DESCRIPTION OF THE DRAWINGS

Other goals, features, advantages and possible applications of the present invention follow from the following description of an embodiment and the Figures. In so doing, the described and/or illustrated features form by themselves or in any arbitrary combination the subject matter of the invention, irrespective of their summary in the claims or their references.

FIG. 2 depicts a screen dot set into a recording field according to the conventional screening process.

FIG. 3 depicts a distribution of dots in the recording field, the distribution being obtained according to a random screening process.

FIGS. 4 to 11 depict examples for uniform basic dot patterns for a dot area of 50% for 4×4 tiles (FIGS. 4 to 8) or 6×6 tiles (FIGS. 9 to 11).

FIGS. 12 to 47 depict examples for basic dot patterns to be inserted according to the invention for 4×4 tiles (FIGS. 12 to 43) or 6×6 tiles combinations of tiles (FIGS. 44 to 47).

FIG. 48 depicts a look up table, showing by way of examples the allocation of tiles and errors to the scanned image values.

DETAILED DESCRIPTION OF THE PREFERRED EMBODIMENTS

Figure 1:
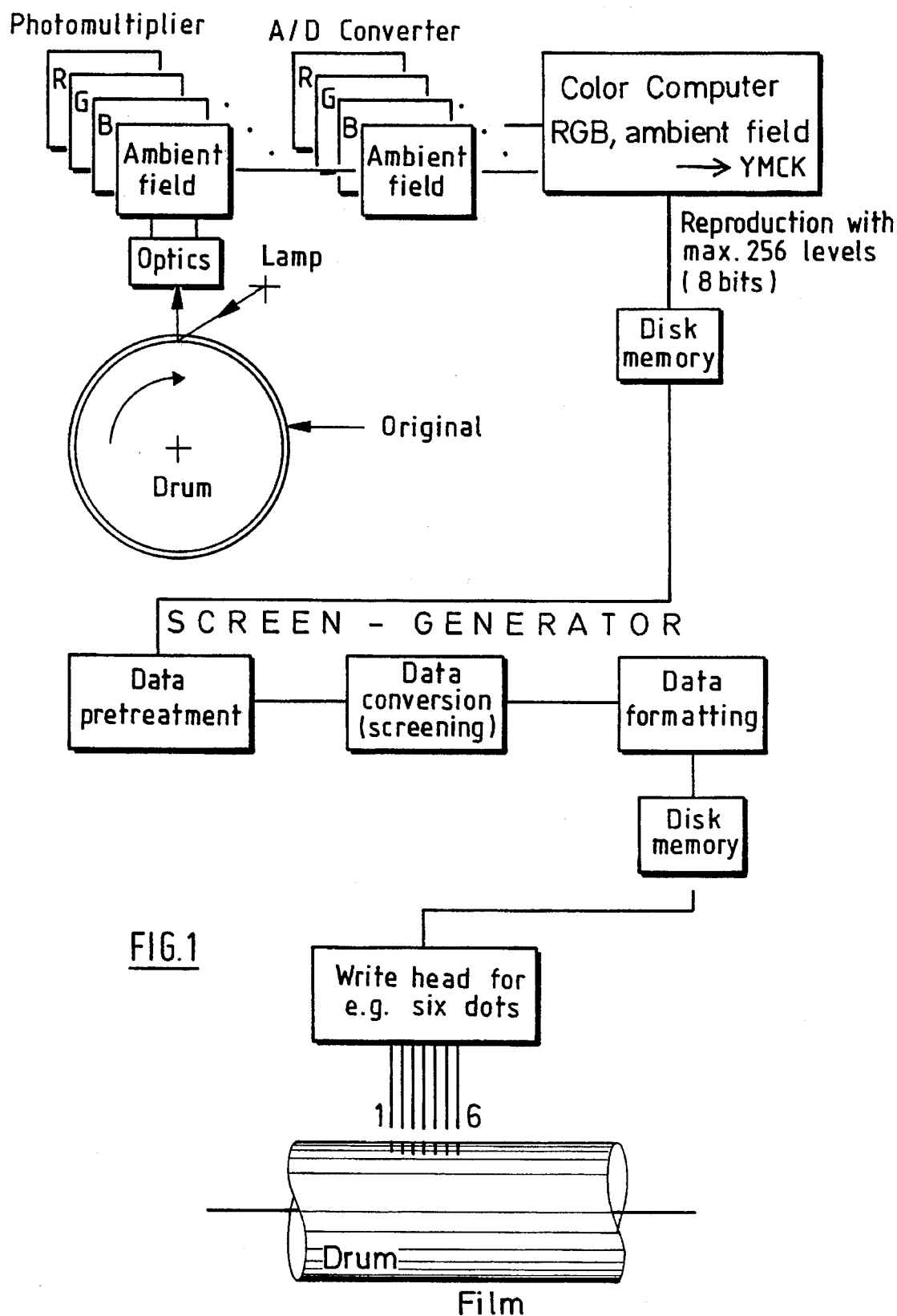
FIG. 1 is a block diagram of an electronic colored halftoned copy processing according to the process of the invention.

The block diagram shown in FIG. 1 shows the sequence for electronic processing of continuous-tone images. The orignal is scanned, e.g. with a drum scanner, during which process each line is divided into areal scan element of equal size. The pattern of lines and columns on which the scanning operation is based is called the "screen".

In the case of multicolored originals, the light beam corresponding to the tint of the scanned scan element is dispersed into three color portions (R-red, G-green, B-blue) by way of a filter. In addition, the ambient field of the scanned scan element is recorded and conveyed with the three colors to four photo multipliers. The analog voltage signals that are received at the photomultipliers and correspond to the brightness (based on the three colors or the ambient field) of the continuous-tone image, are subdivided into 256 tone levels (tone values 0 to 255) by way of an analog-digital converter. Thus, they can be recorded discretely with 8 bits.

In a color computer, the R/G/B values are converted into values for the printing colors (Y-yellow, M-magenta, C-cyan). Furthermore, to increase the contrast range in the print (socalled black), portions of tone value, which combined during reproduction yield gray to a certain degree, are stored as intrinsic separation (the socalled K-value) and further processed just like the other color separations. In addition, any desired color adaptation is figured in. The halftoned copy data thus prepared are dumped, e.g. on a disk.

A screen generator, tailored to the process according to the invention, follows the disk storage, as shown in FIG. 1. First the data are pretreated, during which process, among other things, the relation between the tone value and number of set dots (gradation curve) corresponding to the specifications for the reproduction, i.e. including requests with respect to colors, highlights and shadows, is varied.

During the pretreatment of the data, the data are also adapted to the specified ratio of the size of the scan elements to the size of the recording elements.

Then the scan data are converted into screen image data.

The data conversion to prepare a screened reproduction can be followed, if necesary, by a data formating operation, in which process the image position, the illumination and the data format are determined prior to the reproduction or archiving of the screened halftone image.

In continuous-tone images the brightness changes continuously between a minimum and maximum value, whereas the screened reproductions are constructed from dots with maximum tone value and no prints exhibiting the (minimum) tone value of the recording medium.

In so doing, the tone value determined for a specific scan element of the continuous-tone image is simulated by setting a number of dots, resulting in a percentage dot area corresponding to the tone value of the scan element, at the corresponding spot of the screened halftone image. The screen image data are applied by way of a writing or illuminating device, for example, a write head with laser beam or the like for one or more dots, in example 6, shown in FIG. 1, dots, on the recording medium, e.g. a sheet of paper, a printing plate or a film.

FIG. 2 shows a screen field 1', into which according to the conventional screening method a single screen dot 2' was set with a percentage dot area corresponding to the tone value of the assigned scan element of the original. To construct such a screen dot 2' the screen field 1' contains a specific number of recording elements 4' (here 12×12=144 square recording elements 4'). In the present case a number of dots 3', which correspond to the percentage dot area and which are set in recording elements 4' provided in the screen field 1', are combined into a single screen dot 2' and in particular in the center of the screen field 1'. In the conventional screening method between approximately 30 to 60 screen dots 2' per centimeter are usually set. The spatial resolution thus obtained leaves much to be desired in many cases. Furthermore, with this process during superimposed printing several color separations can form rosetta moirés and other moirés, which together with other disturbing effects such as tone skip when dot contact is occurring for the first time and obliteration of dots at low tone values, significantly reduce the quality of the reproduction.

In the case of the screen field i shown in FIG. 3, the dots 3 are distributed according to a random process arbitrarily on the recording elements 4 of the recording field 1. The number of dots 3 that are set corresponds to the number of dots 3' in FIG. 2, so that the result is an identical percentage dot area. By means of such random distribution of the dots 3 rosetta moirés and other moirés can certainly be avoided, but granularity and noise occur in the haftoned copy, especially in the midtone range when—randomly distributed— several dots make contact for the first time at many spots. As a consequence of the random setting of dots, accumulations of dots and regions with below average dot number can occur—even in regions with identical tone value, and lead to darker spots or brighter spots (formation of clustered dots and clustered no prints).

To avoid such structures that are not a part of the picture, the recording field 1 is divided, according to the process of the invention, into rectangular, in particular square tiles 5 with a specific number of recording elements 4. As apparent from FIGS. 4 to 11, the tiles 5 exhibit, e.g. 4×4=16 or 6×6=36 recording elements 4. Preferably the area of the tiles 5 corresponds to the area of the respective scan elements, so that the tone value of each color in each tile 5 is constant and the scan resolution remains preserved.

Fixed dot distributions, which are stored as bit maps and are available for processing a recording field 1, are assigned to the individual dot area levels that can be reproduced in the tile 5. To enable a uniform reproduction of the original with a minimum of granularity and noise, one proceeds when determining the dot distribution from uniform basic patterns for 50% dot area (see FIGS. 4 to 11).

All other dot area levels shown with the tile 5, i.e. dot distributions are defined by adding or subtracting dots 3 from the respectively chosen basic pattern.

To achieve a dot area of below 50%, with the goal of further reducing the granularity caused by dot contact, preferably dots 3 that touch each other are removed. In so doing and in removing other dots, it must be checked by superimposing the dot patterns generated thus with the other dot patterns need for the same dot area level, whether the standard according to which the individual patterns are to be different has been considered as extensively as possible. When adding dots to the basic patterns to achieve dot area levels exceeding 50% special attention should be paid to the fact that the distribution of the recording elements 4 not covered with dots remains uniform in order to counteract noise in the reproduction of the picture.

As an alternative to this process the dots 3 to be added or subtracted can be determined by random choice.

Figure 13:
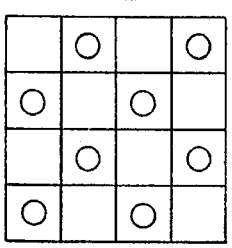
Figure 15:
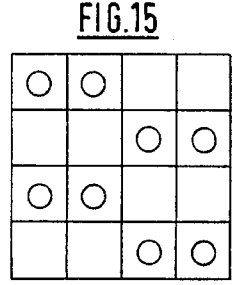
Figure 16:
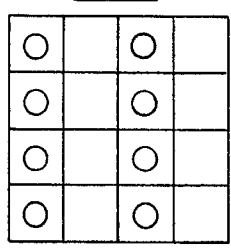
Figure 18:
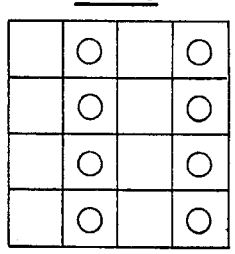
Figure 19:
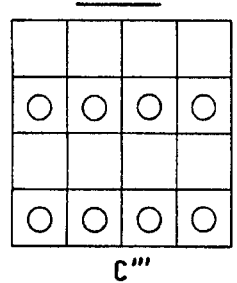
Figure 21:
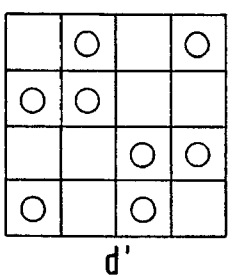
Figure 22:
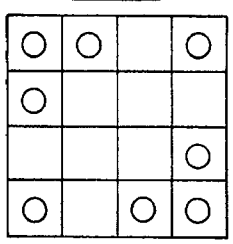
Figure 23:
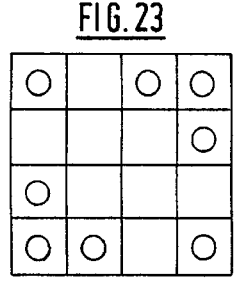
Figure 25:
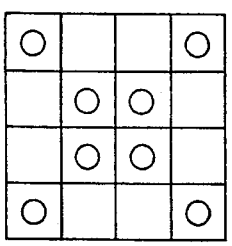
Figure 26:
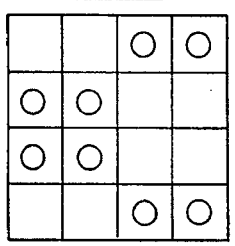
Figure 27:
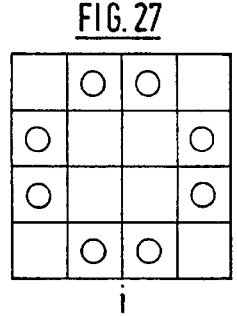
Figure 28:
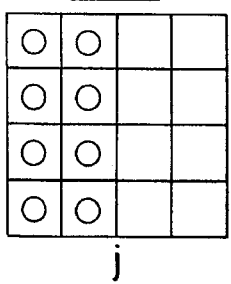
Figure 29:
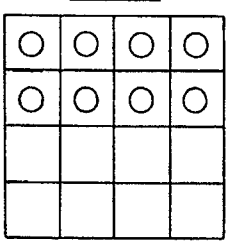
Figure 30:
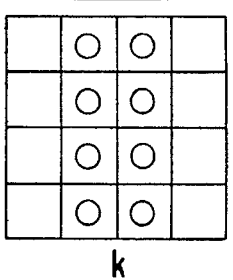
Figure 31:
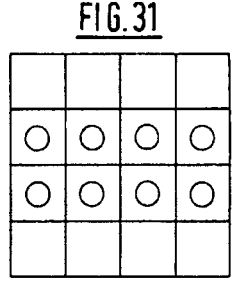

The criteria "translation prohibition" and "overlapping ratio as close to 1 as possible", can be considered as follows:

The variations in the basic dot patterns for 4×4 tiles, shown in FIGS. 4 to 8, correspond to the FIGS. 12, 17, 14, 20 and 24. All other examples for basic dot patterns that are shown in FIGS. 12 to 31 were derived from these patterns by rotating, shifting (translation) and by enlarging or reflecting 2×2 subtiles. Thus, e.g. FIGS. 15, 16, 21, 23 and 29 were obtained by rotating by 90° the basic dot pattern FIGS. 14, 17, 20, 22 and 28 (cf. to this end also FIG. 5 with FIG. 9 and FIG. 6 with FIG. 10). The basic dot pattern or FIG. 25 is produced from the basic dot pattern of FIG. 24 by diagonally shifting by one recording element; FIGS. 26, 27 and 30 were produced from FIGS. 25, 26 and 28 by shifting horizontally by one recording element. FIG. 13 can be obtained from FIG. 12 both by rotating by 90° and by translating by one recording element. The same applies, e.g., to FIG. 18 (from FIG. 17 or FIG. 16), FIG. 19 (from FIGS. 18 or FIG. 17), FIG. 31 (from FIG. 30 or FIG. 29). FIG. 24 is obtained by enlarging a 2×2 subtile from FIG. 12; FIG. 28 correspondingly from FIG. 16. FIG. 22 is produced fom FIG. 21 by reflecting the upper left and bottom right 2×2 subtile.

Many basic dot patterns from FIG. 12 to 31 have already been used in known, but with different methods. This applies, as aforementioned, e.g. to the chess board pattern. With respect to the spatial resolution, however, even the size of the tile for which the basic dot pattern is established is of significance. In the case of the chess board patterns, which are described in the U.S. Pat. No. 5,107,331 and where individual color separations are shifted from each other, the identically tinted subareas of the chess board specified at 50% dot area comprise 4×4 dots; in FIGS. 24 to 27 only 2×2; in FIG. 12 only one dot.

Relevant for the advantages targeted with the process according to the invention is the method by which the basic dot patterns are combined taking into consideration the criteria "as different as possible", "translation prohibition", and "overlapping ratio".

Owing to the criterion "translation prohibition" a combination of basic dot patterns, which differ only through a translation (even when the translation resulted from a rotation) must be ruled out, as aforementioned. Suitable combinations are the basic dot patterns of FIGS. 12, 14, 15, 16, 17, 24, 28 and 29, which differ due to angular rotation by 90' or due to differences in the patterns of the 2×2 subtiles or due to shifting one portion of the 2×2 tiles.

With respect to the criterion "overlapping ratio as close to 1 as possible", e.g. when four basic dot patterns a, b, b' and c, are combined, as apparent from FIGS. 32 to 37, when basic dot patterns overlap in pairs, the result is an overlapping of 50% of the dots with the dots of the other basic dot pattern and for the rest of the dots no overlapping. Thus, the criterion "overlapping ratio as close to 1 as possible" is fulfilled for all of the aformentioned combinations (the same applies, e.g. to combinations of basic dot patterns a', c', c''', f or a, b', c''', k'). When all four basic dot patterns (or color separations) are superimposed, as apparent from FIG. 38, the following variations occur: 1 recording element without dot, 4 with only one, 6 with overlapping of two dots, 4 with three dots and finally 1 recording element with overlapping of 4 dots. In addition, there are not only extreme situations of dots that totally overlap or lie side by side without overlapping. Owing to the continuous noise in the system, the dots are not always set in accordance with the screen exactly on the recording elements. The result is an overlapping of dots that varies from place to place and from color separation to color separation.

In FIGS. 40 to 43, pairs of combinations of basic dot patterns are reproduced, where the ratio ü/n of the overlapping dots to the non-overlapping dots of a basic pattern is not equal to 1 (e.g. in FIGS. 40 and 42: 6/2; in FIGS. 41 and 43: 2/6). In cases where ü/n=n'/ü', the demand that the "overlapping ratio be as close to 1 as possible" can be met by using alternatingly the combinations when processing tiles within the recording fields. The alternating can be done in specific or random order (FIGS. 44 and 45).

Figures 46, 47:
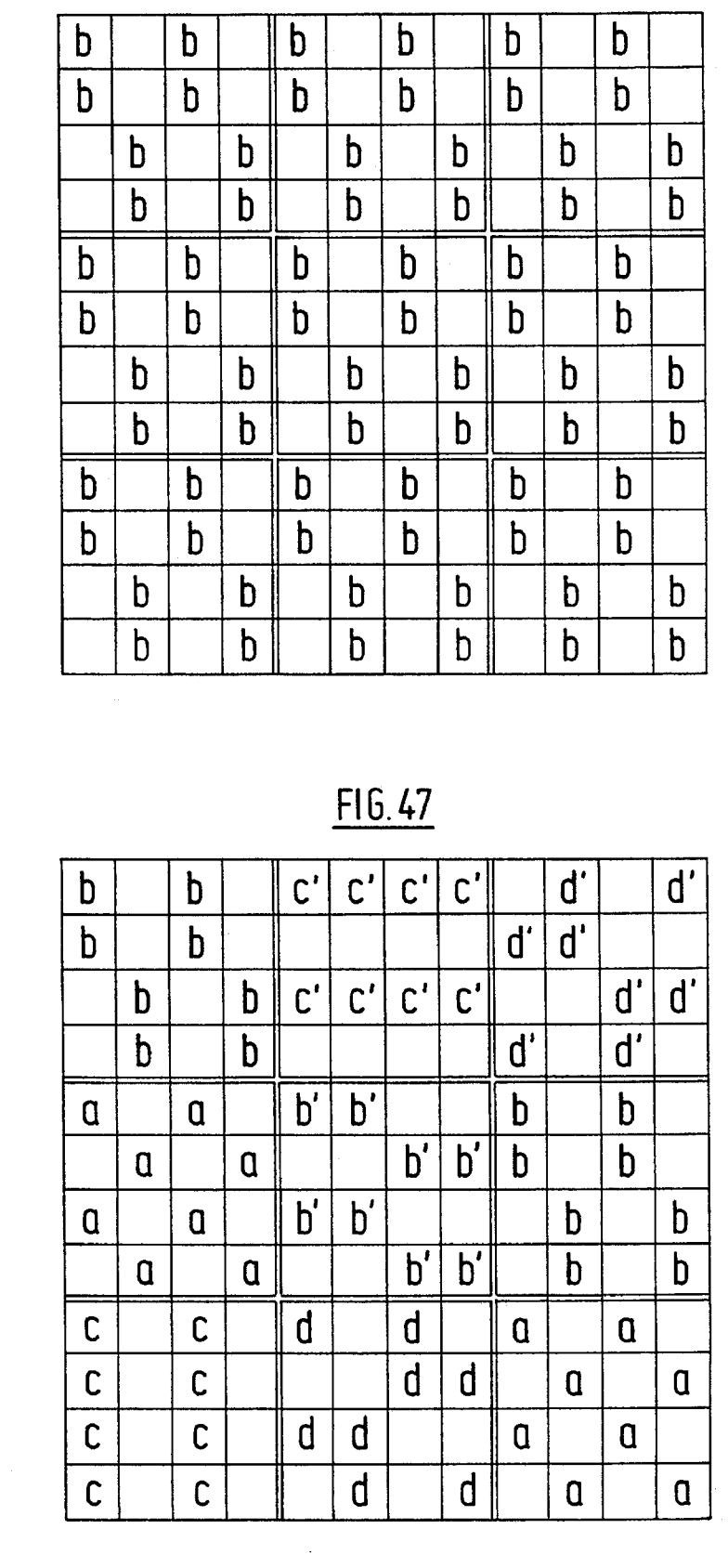

The criterion "as different as possible basic dot patterns" can be fulfilled not only by using an intrinsic basic dot pattern for each color separation (FIG. 46) but also by using several, different basic dot patterns in a specific or random sequence for all color separations (FIG. 47).

As shown, the 4×4 tile gives sufficient plurality of "as different as possible basic dot patterns". Owing to the deterioration of the spatial resolution it is not expedient to work with larger tiles.

In contrast, the resolution of the tone value decreases, as stated above, as the size of the tile decreases due to the decreasing number of realizable tone levels. This drawback can be readily overcome by considering the possible deviation of the reproduced tile from the specified tone value while processing the other tiles.

For FIGS. 4 to 8, 17 tone levels are possible, for example; for FIGS. 9 to 11 altogether 37 tone levels are possible. On the scanning side, however, 356 tone levels at 8 bits can be differentiated. If, therefore, the determined tone value does not by chance correspond to a tone level that can be reproduced in a tile, then the result is an error with respect to the tone value of the associated scan element. The allocation of tiles and resulting errors to the scan-sided tone levels can be accomplished, as well-known, simply and quickly by way of a look up table. Assuming that the recording takes place in 4×4 tiles, then 17 tone levels are available within a tile on the recording side, in particular the values 0, 1, 2, 3, . . . , 15 and 16. If the scanned tone value is put in column 1 of a table, the assigned tile in column 2 and the error resulting from the allocation is put in column 3, the result is a table, the beginning of which is shown in FIG. 48.

The error can be considered in various ways. In the case of equipment that can generate only a limited number of tone levels (e.g. computer monitors) it is generally known to generate intermediate values by combining two or more dots of adjacent tone values (see Stoffel et al., loc. cit.). To this end, for example, the process of error diffusion can be applied. It is very wide spread for sequential, line-by-line processing of a halftoned copy. The error resulting from setting a dot (here: tile) is distributed over the next recording elements (here: tiles) that are not yet processed, i.e. subtracted from the tone values given there. In case of recording with equipment that can generate only 2 tone values, this process is known as the Floyd-Steinberg algorithm (see Floyd et al., in SID Int. Sym. Digest of Tech. Papers, 1975, pp. 36 to 37 and Proc. SID, Vol. 17/2, 1976, pp. 75 to 77) and is useful due to its ease of implementation. Since this process can lead to undesired structures on account of the sequential image processing, it is frequently modified (see e.g. Peter Stucki, Report no. 92.03 of the Institut für Informatik der Universität Zürich, March 1992). Errors can also be taken into account, e.g. by viewing 2×2 fields of the tiles used together and compensating the error between them in such a manner that the error in the 2×2 field becomes as small as possible.

Compared to the conventional (so-called autotypical) halftone screening, the process according to the invention results in a reproduction of the original whose resolution is improved. Furthermore, the risk of disturbing effects due to register variations and interferences is reduced and tone skip when dot contact is occurring for the first time and obliteration of dots at low tone values are avoided. Compared to random screening, such disturbing effects as granularity, noise, formation of clustered dots and clustered no prints that occur with the method are avoided.

List of Reference Numerals

| | |
|---|---|
| 1, 1' | recording field |
| 2' | screen dot |
| 3, 3' | dots |
| 4, 4' | recording elements |
| 5 | tile |

Explanation of the figures:

[ ] recording element without dot

[o] or [hatched] recording element with dot a to k: 4×4 tiles with varying basic patterns

[a] recording element with dot in one tile with basic pattern a

[*] When tiles with varying basic patterns are overlapped, recording element in which dots overlap: overlapping 2 dots *=x; 3 dots *=y; 4 dots *=z

We claim:

1. A method of electronically processing a multicolored continuous-tone original image, said method comprising:

scanning each of plural scan element areas of the original image on a line by line or column by column basis;

determining a brightness of each of said scan element areas for each of plural colors and converting each brightness into a corresponding digital tone value denoting a tone level of a respective one of plural recording fields of a to be reproduced image, each of said plural recording fields formed by a plurality of recording element areas;

dividing each recording field into plural tiles each having an identical size and an identical number of recording element areas, wherein a number of tone levels that can be differentiated within each tile is specified by the number of recording element areas contained in each tile; and, accessing a data memory and assigning a prestored dot pattern to each of said plural tiles of each recording field according to said digital tone value of said recording field to obtain a representation of the to be reproduced image;

wherein said assigning of each prestored dot pattern to each tile includes determining a plurality of different basic dot patterns for said respective plural colors, wherein said different basic dot patterns remain distinct from one another when any one or more of said basic dot patterns is translated, wherein each basic dot patterns has dots in 50% of said recording element areas of each tile, and wherein, upon superimposing pairs of said different basic dot patterns of each tile, a ratio $\ddot{u}/n$ of overlapping dots $\ddot{u}$ to non-overlapping dots n in each tile is substantially equal to at least one of 1 and a ratio $n'/\ddot{u}'$ of non-overlapping dots n' to overlapping dots $\ddot{u}'$ of an adjacent tile.

2. A method as claimed in claim 1, further comprising assigning the basic dot patterns by at least one of rotating another basic dot pattern by 90°, enlarging a subtile of another basic dot pattern, shifting a subtile of another basic dot pattern and reflecting a subtile of another basic dot pattern.

3. A method as claimed in claim 1, further comprising maximizing a difference between overlapping dot patterns of different colors when dots are added to or subtracted from the basic dot patterns to obtain tone levels which differ from a 50% dot area.

4. A method as claimed in claim 1, wherein at least two different basic dot patterns of a same color are assigned for at least two different respective tiles within a same recording field.

5. A method as claimed in claim 1, wherein said tiles are formed each having a 4×4 matrix of recording element areas.

6. A method as claimed in claim 1, further comprising determining an error between an actual tone value and a desired tone value of a tile, and processing the dot pattern of another tile to compensate for said error.

* * * * *